US012705441B2

(12) United States Patent
Terauchi et al.

(10) Patent No.: US 12,705,441 B2
(45) Date of Patent: Aug. 11, 2026

(54) INFORMATION CODE READING DEVICE

(71) Applicant: DENSO WAVE INCORPORATED, Chita-gun (JP)

(72) Inventors: Yoshihide Terauchi, Chita-gun (JP); Koji Konosu, Chita-gun (JP); Satoru Sugiura, Chita-gun (JP); Kazumi Kambe, Chita-gun (JP); Kouichi Yano, Chita-gun (JP); Takeshi Miwa, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 168 days.

(21) Appl. No.: 18/646,123

(22) Filed: Apr. 25, 2024

(65) Prior Publication Data

US 2024/0362432 A1 Oct. 31, 2024

(30) Foreign Application Priority Data

Apr. 26, 2023 (JP) ................................ 2023-072334

(51) Int. Cl.
*G06K 7/00* (2006.01)
*G06K 7/14* (2006.01)

(52) U.S. Cl.
CPC ......... *G06K 7/0008* (2013.01); *G06K 7/1404* (2013.01)

(58) Field of Classification Search
None
See application file for complete search history.

(56) References Cited

U.S. PATENT DOCUMENTS

2009/0016532 A1* 1/2009 Baldischweiler .... G06Q 20/341 713/193
2013/0038985 A1* 2/2013 Powell .................. G06K 7/109 361/679.01
2016/0140371 A1* 5/2016 Pierce ................ G06K 17/0022 235/462.25

FOREIGN PATENT DOCUMENTS

CN 207458063 U 6/2018
JP 4463188 B2 5/2010

* cited by examiner

*Primary Examiner* — Kristy A Haupt
(74) *Attorney, Agent, or Firm* — Oliff PLC

(57) ABSTRACT

An information code reading device includes a processor and a memory, wherein the processor executes a program stored in the memory to: perform reading processing by using electric power supplied from an external power supply through a cable; wirelessly transmit a reading result to a predetermined external device; determine whether power supply through the cable is shut off; and perform a predetermined notification using electric power supplied from a power storage circuit element in response to determination that the power supply is shut off, the reading processing is processing for optically reading an information code, and the information code reading device comprises the power storage circuit element.

16 Claims, 10 Drawing Sheets

60
HOST COMPUTER
10
70
EXTERNAL POWER SUPPLY
COMMUNICATION I/F
25
42
POWER STORAGE UNIT
41
POWER CONTROL UNIT
50
21
CONTROL UNIT
NOTIFICATION UNIT
24
30
32
Lr
33
31
STORAGE UNIT
22
OPERATION UNIT
23
Lf
R1
C1

HOST COMPUTER
60
10
COMMUNICATION I/F
25
42
POWER STORAGE UNIT
41
POWER CONTROL UNIT
52
51
50
EXTERNAL POWER SUPPLY
70
21
CONTROL UNIT
NOTIFICATION UNIT
24
30
32
Lr
33
31
STORAGE UNIT
22
OPERATION UNIT
23
Lf
R1
C1

INFORMATION CODE READING DEVICE

CROSS-REFERENCE TO RELATED APPLICATIONS

This application is based on and claims the benefits of priority from earlier Japanese Patent Application No. 2023-072334, filed on Apr. 26, 2023, the descriptions of which are incorporated herein by reference.

BACKGROUND

1. Technical Field

The present disclosure relates to an information code reading device.

2. Related Art

Conventional cabled information code reading devices (that is, scanners) can achieve lower costs by supplying electric power and transmitting/receiving data through cables. However, multiple types of devices may be needed depending on the requirements of external devices to be connected, such as a host computer. This may complicate the production management of scanners. In some cases, an increase in order quantity of the scanner may inhibit cost reductions of the scanner. In a case where the external devices to be connected are mobile terminals such as a tablet and a smartphone, the scanner is cable-connected with a mobile terminal directly or via a conversion connector. Thus, frequent connections may damage the connector of the scanner.

There is an example wireless scanner as disclosed in the patent literature (JP 4463188 B2). The wireless scanner has a wireless communication function and wirelessly transmits the signal of a read information code. The wireless scanner also has a rechargeable battery.

SUMMARY

However, wireless scanners are more easily stolen than scanners that use a cable for data transmission. On the other hand, the cable connectors of scanners that use a cable for data transmission may be damaged.

The present disclosure has been made to solve the problems described above, and an object of the disclosure is to provide an information code reading device capable of preventing unauthorized removal of the information code reading device or detecting early unauthorized removal of the information code reading device, and also reducing wear and tear on the cable connector of the information code reading device.

An information code reading device according to an embodiment of the present disclosure, includes a processor and a memory, wherein the processor executes a program stored in the memory to: perform reading processing by using electric power supplied from an external power supply through a cable; wirelessly transmit a reading result to a predetermined external device; determine whether power supply through the cable is shut off; and perform a predetermined notification using electric power supplied from a power storage circuit element in response to determination that the power supply is shut off, the reading processing is processing for optically reading an information code, and the information code reading device comprises the power storage circuit element.

BRIEF DESCRIPTION OF THE DRAWINGS

FIG. 7 is a flowchart showing processing of an information code reading device according to a fifth embodiment.

FIG. 8 is a flowchart showing processing of a power supply terminal serving as an external power supply according to a seventh embodiment.

DETAILED DESCRIPTION OF THE PREFERRED EMBODIMENTS

Wireless scanners require the management of battery charging and remaining battery power as well as the maintenance of the battery and the battery charger. Furthermore, wireless scanners are vulnerable to theft because they are wireless. In particular, in a case where an information code reading device is used for a self-checkout terminal or a smartphone as a checkout terminal, the information code reading device may be used in an area difficult for shop staff to monitor. In this case, unauthorized removal (for example, theft) of the information code reading device seems more likely to occur. However, an information code reading device according to an embodiment of the present disclosure enables prevention of unauthorized removal, or early detection of unauthorized removal.

First Embodiment

An information code reading device according to a first embodiment of the present disclosure will now be described with reference to the drawings.

Figure 1:
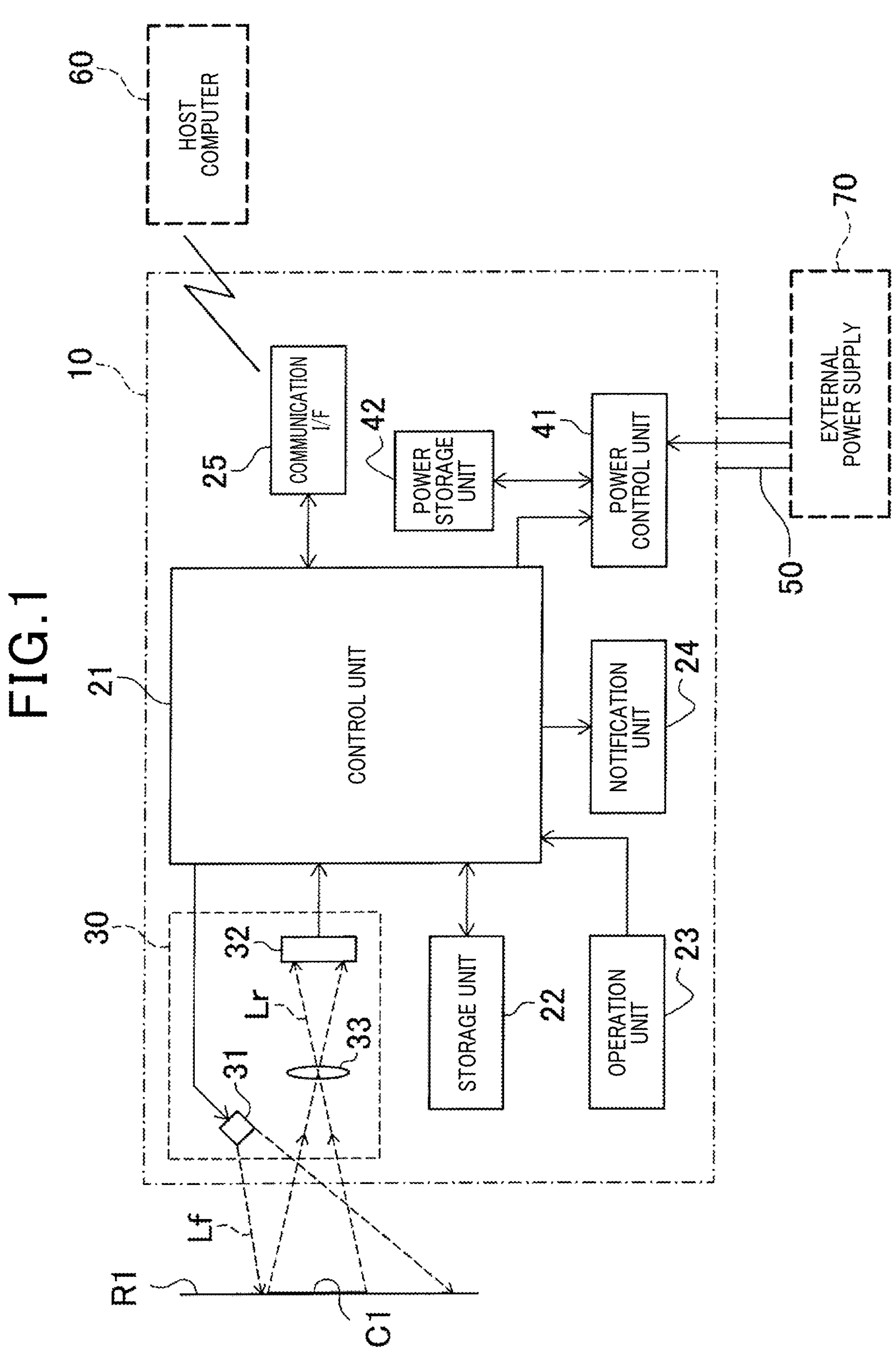
FIG. 1 is a block diagram schematically illustrating the configuration of an information code reading device according to a first embodiment.

An information code reading device 10 illustrated in FIG. 1 may be a cabled mobile reading device (That is, a scanner) that optically reads information codes such as a bar code and a QR code (registered trademark). The information code reading device 10 includes a synthetic resin case 11 illustrated in FIG. 2. The case 11 contains various electronic components of the information code reading device 10. In the present embodiment, the scanner (i.e., the information code reading device 10) includes no battery for information code reading processing. The scanner performs reading processing using power supplied through a cable.

Figure 10:
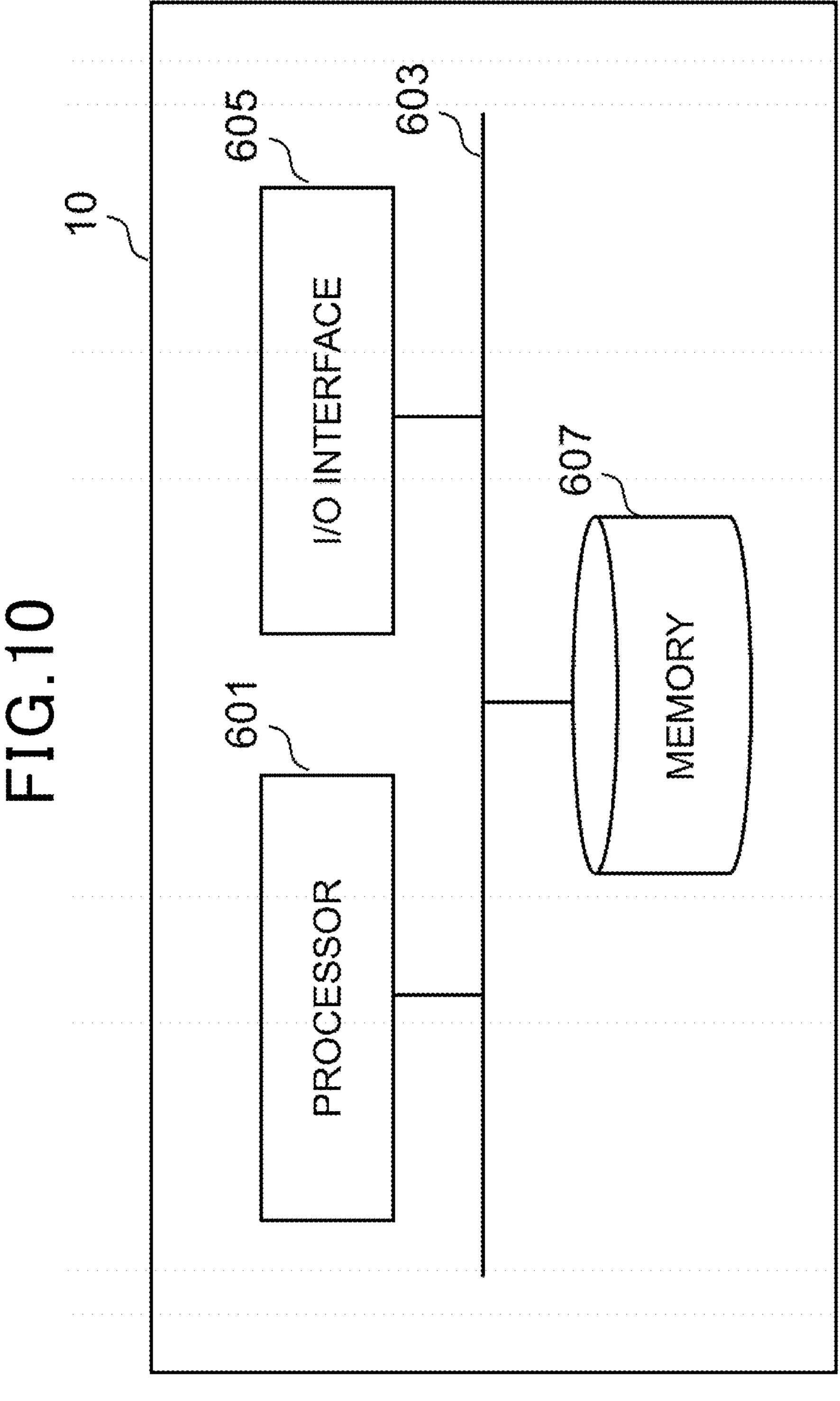
FIG. 10 is a hardware configuration diagram of an information code reading device according to an embodiment of the present disclosure.

The information code reading device 10 includes a control unit 21 for controlling the information code reading device 10, and a storage unit 22. The information code reading device 10 may include a microcomputer. As illustrated in FIG. 10, the information code reading device 10 may include a processor 601 such as a central processing unit (CPU), a system bus 603, an Input/Output interface 605, and a memory 607 such as a read-only memory (ROM) or a random-access memory (RAM). The processor 601 may execute a program stored in the memory 607 to implement processing of the above-described control unit 21. The memory 607 may implement functions of the above-described storage unit 22.

The information code reading device 10 also includes an operation unit 23, a notification unit 24, and a communication interface 25. The operation unit 23 may include a trigger key provided, for example, on the outside of the case 11. The operation unit 23 transmits an operation signal to the control unit 21 in response to a user's key operation. The control unit 21 performs processing in response to the operation signal received from the operation unit 23.

The notification unit 24 includes a light emitter such as a light emitting diode (LED) provided on the outside of the case 11, a sound output portion such as a speaker or a buzzer, and a vibrator. For the notification unit 24, the control unit 21 controls the light emission state of the light emitter, the output state of the sound output portion, and the vibration state of the vibrator. The control allows notification indicating the reading result of reading processing and predetermined notification described later.

The communication interface 25 communicates wirelessly or via a wired connection with a predetermined external device such as a host computer 60. The communication with the predetermined external device is direct communication through, for example, Bluetooth (registered trademark) or indirect communication through an access point (also referred to as AP) illustrated in FIG. 2. The communication interface 25 performs communication processing in cooperation with the control unit 21.

The information code reading device 10 includes an optical system 30 controlled by the control unit 21. The optical system 30 is used to optically read information codes. The optical system 30 mainly includes an illuminating light source 31 as a light emitting optical system, a light receiving sensor 32 as a light receiving optical system, and an image forming lens 33. The illuminating light source 31 applies illumination light Lf through a reading port (not shown) formed in the case 11. The illuminating light source 31 includes, for example, a red LED and a diffusion lens facing the emitter of the LED. The light receiving sensor 32 receives reflected light Lr of light emitted from the illuminating light source 31. The light receiving sensor 32 may be, for example, an area sensor having two-dimensionally arranged light receiving elements that are solid-state imaging elements such as complementary metal-oxide semiconductors (C-MOS) or charge-coupled devices (CCDs). The light receiving sensor 32 receives, on its light receiving surface, incident light coming through the image forming lens 33. The light receiving sensor 32 may be, for example, implemented on a printed circuit board. FIG. 1 is a conceptual diagram illustrating an example of applying the illumination light Lf to a reading target R1 having an information code C1.

In response to a trigger key operation, the control unit 21 starts reading processing for reading data recorded on an information code from an image including the information code captured by the light receiving sensor 32 of the optical system 30. In the reading processing, the data recorded on the information code is decoded by a predetermined decoding method. Then, the reading result is transmitted to the host computer 60 through the communication interface 25 without being stored in the storage unit 22.

The information code reading device 10 includes a power control unit 41 and a power storage unit 42. The power control unit 41 feeds electric power supplied from an external power supply 70 through a cable 50 to the control unit 21 and various electrical components. The electric power supplied from the external power supply 70 through the cable 50 is also used for the above-described reading processing and the transmission of the reading result to the host computer 60. In the present embodiment, the external power supply 70 is a personal computer having a Universal Serial Bus (USB) port capable of supplying electric power in a USB connected state via the cable 50.

The power storage unit 42 may be, for example, a power storage circuit element such as a high-capacitance capacitor. The power storage unit 42 is charged by the power control unit 41 using the electric power supplied from the external power supply 70. Under a predetermined condition, the power storage unit 42 supplies the notification unit 24 with electric power used for notification. The electric power stored in the power storage unit 42 is insufficient for the reading processing and the transmission of the reading result. In this manner, the information code reading device 10 according to the present embodiment includes the power storage unit 42 for notification, but not a power storage unit for the reading processing and transmission of the reading result.

In the information code reading device 10, in response to a trigger key operation for starting the reading processing, the electric power supplied from the external power supply 70 through the cable 50 is used by the control unit 21 to start the reading processing. The reading result is then transmitted. In this manner, the reading processing and the transmission of the reading result are achieved by using the electric power supplied from the external power supply 70 through the cable 50. Thus, with the cable 50 disconnected from the external power supply 70, the reading processing and the transmission of the reading result are not performed even when the power storage unit 42 is charged with electric power.

In the present embodiment, the control unit 21 performs processing for detecting an unauthorized removal (also simply referred to as detection processing). In the detection processing, the control unit 21 determines whether the power supply via the cable 50 is shut off. In a case where it is determined that the power supply is shut off, the control unit 21 causes the notification unit 24 to perform predetermined notification for a fixed period during which the electric power supplied from the power storage unit 42 is available (for example, 10 seconds). For example, a thief may disconnect the cable 50 from any one of the information code reading device 10 and the external power supply 70 or cut off the cable 50 in an attempt to remove the information code reading device 10 in an unauthorized manner. In this case, as described above, it is determined that the power supply is shut off, and the predetermined notification is performed.

Figure 2:
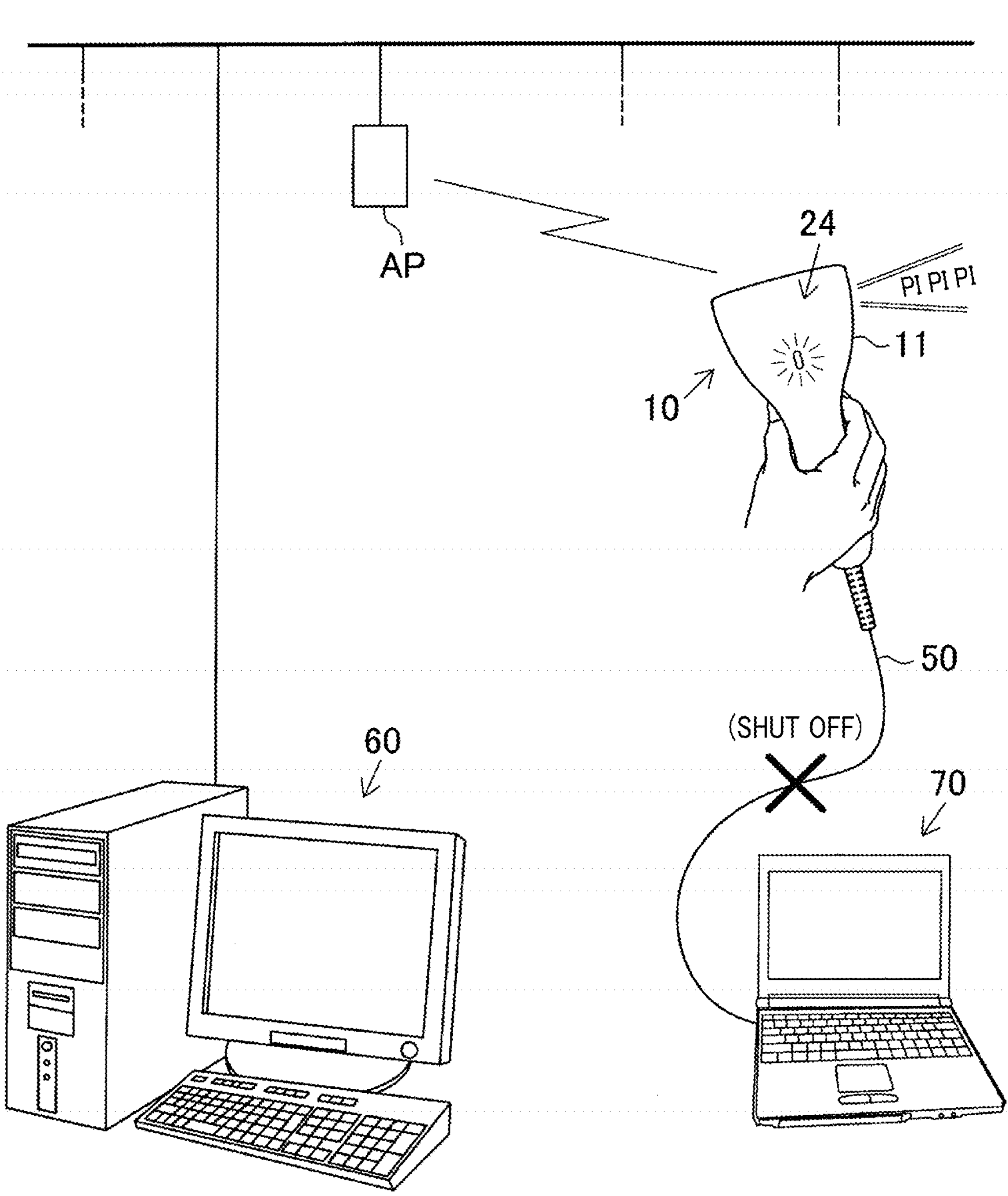
FIG. 2 is a diagram illustrating an example of predetermined notification performed by means of a notification unit upon determination that the power supply is shut off in the first embodiment.

The predetermined notification may be, for example, light emission by the light emitter of the notification unit 24 and output by the sound output portion, as illustrated in FIG. 2.

The control unit 21 controls the light emission state of the light emitter and the output state of the sound output portion.

As described above, the information code reading device 10 according to the present embodiment includes no battery for the reading processing. The reading result of the reading processing performed by using the electric power supplied from the external power supply 70 through the cable 50 is transmitted to the host computer 60 through the wireless communication by the communication interface 25. When the power supply via the cable 50 is shut off, the control unit 21 causes the notification unit 24 to perform the predetermined notification.

Since the reading result is transmitted wirelessly, a problem due to a wired connection is less likely to occur than in a case of a wired connection with the host computer 60 to which the reading result is transmitted. That is, it is possible to reduce wear and tear on the cable connector of the information code reading device. The information code reading device 10 is connected to the external power supply 70 via the cable 50. Thus, the device is difficult to remove unlike a wireless information code reading device. That is, the information code reading device 10 can be prevented from being removed in an unauthorized manner. Even if the information code reading device 10 is removed in an unauthorized manner, managers near the information code reading device 10 can be notified of the unauthorized removal of the information code reading device 10 by the predetermined notification performed when the power supply via the cable 50 is shut off. Accordingly, the unauthorized removal; of the information code reading device 10 can be prevented. Alternatively, even if the information code reading device 10 is removed in an unauthorized manner, unauthorized removal can be reported. As a result, the unauthorized removal can be detected early.

Upon determination that the power supply is shut off, the notification unit 24 performs the predetermined notification using the electric power supplied from the power storage unit 42. This ensures electric power for the predetermined notification even when the predetermined notification requires electric power. For predetermined notification and a notification unit that require no power supply from the power storage unit 42, the power storage unit 42 may not be included.

Figure 3A:
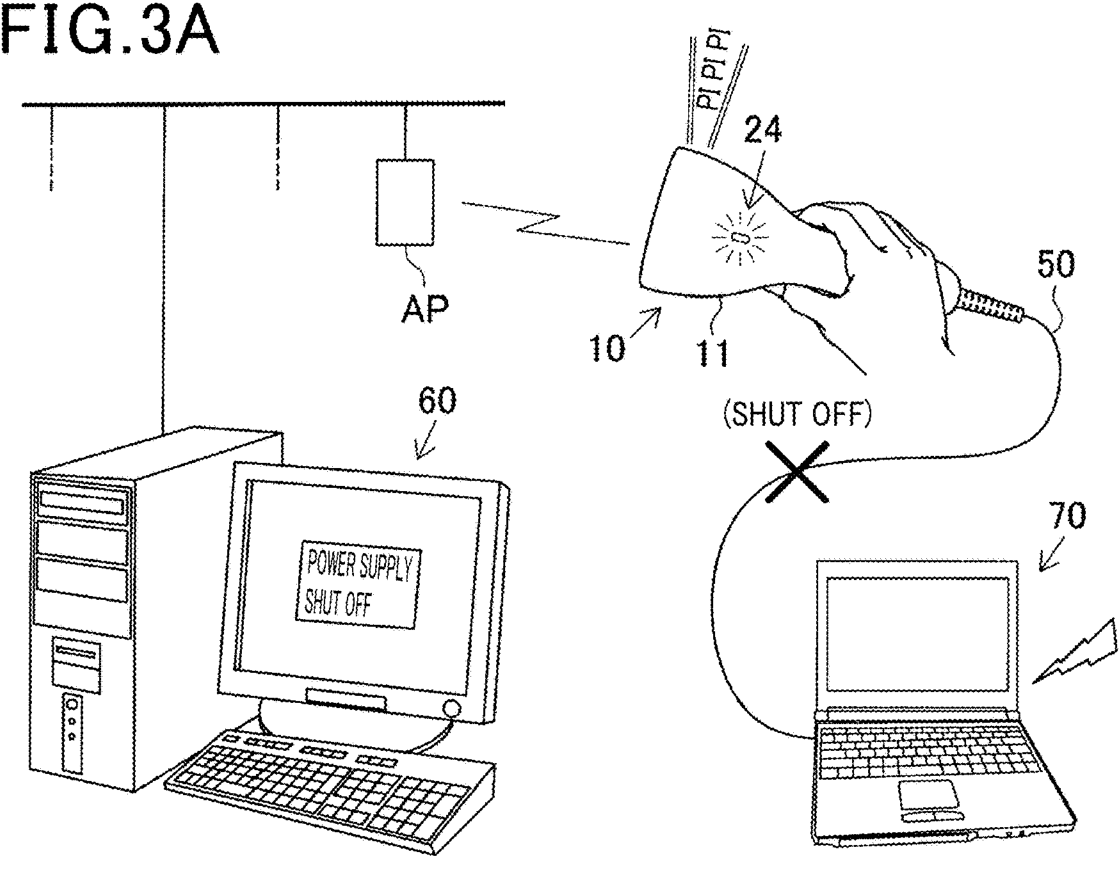
FIG. 3A is a diagram illustrating an example of notification performed by a host computer that has received a predetermined notification from the information code reading device.
Figure 3B:
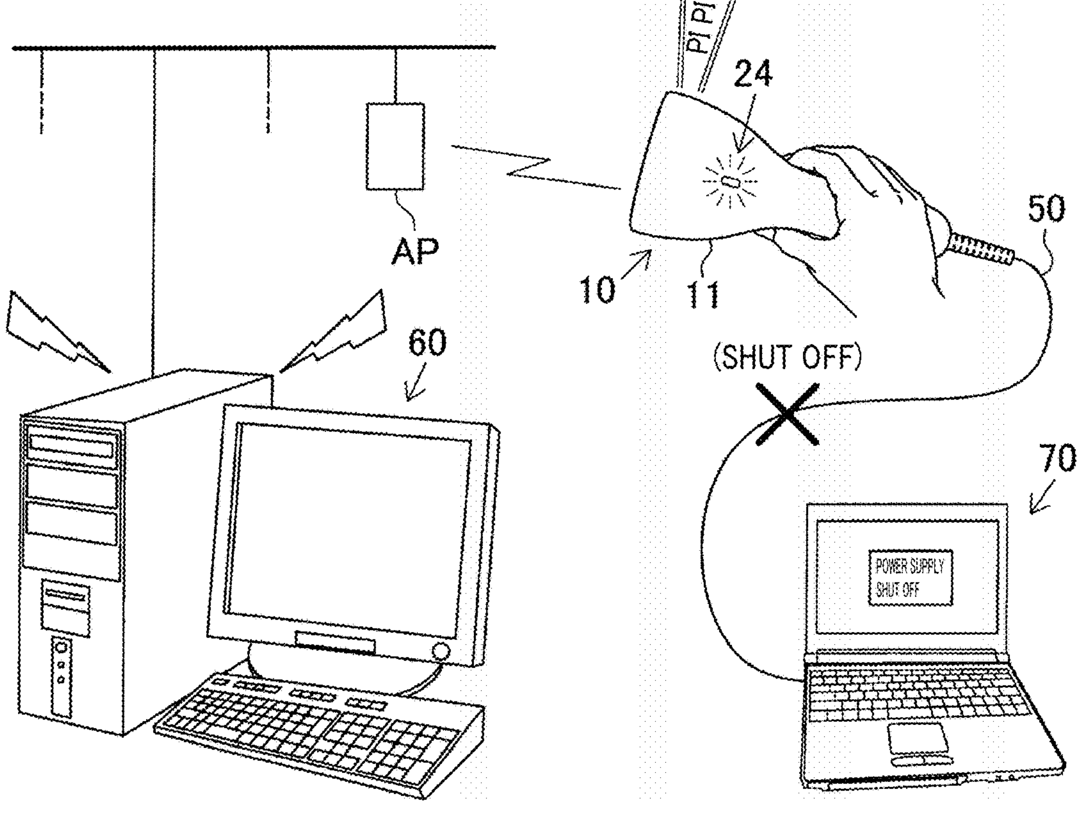
FIG. 3B is a diagram illustrating an example of notification performed by a personal computer that is an external power supply.

The above-described predetermined notification is not limited to notification by the notification unit 24 to the surroundings of the information code reading device 10. Alternatively or additionally, the predetermined notification may be transmission through wireless communication by the communication interface 25 to a predetermined external device such as the host computer 60. For example, as illustrated in FIG. 3A, the host computer 60 that has received the predetermined notification may display a screen concerning the predetermined notification using, for example, a display. This enables the manager of the host computer 60 to know of an unauthorized removal. Furthermore, the personal computer serving as the external power supply 70 may determine that the power supply is shut off and perform the predetermined notification. For example, as illustrated in FIG. 3B, the personal computer serving as the external power supply 70 may display a screen concerning the unauthorized removal for the manager of the personal computer.

Figure 4:
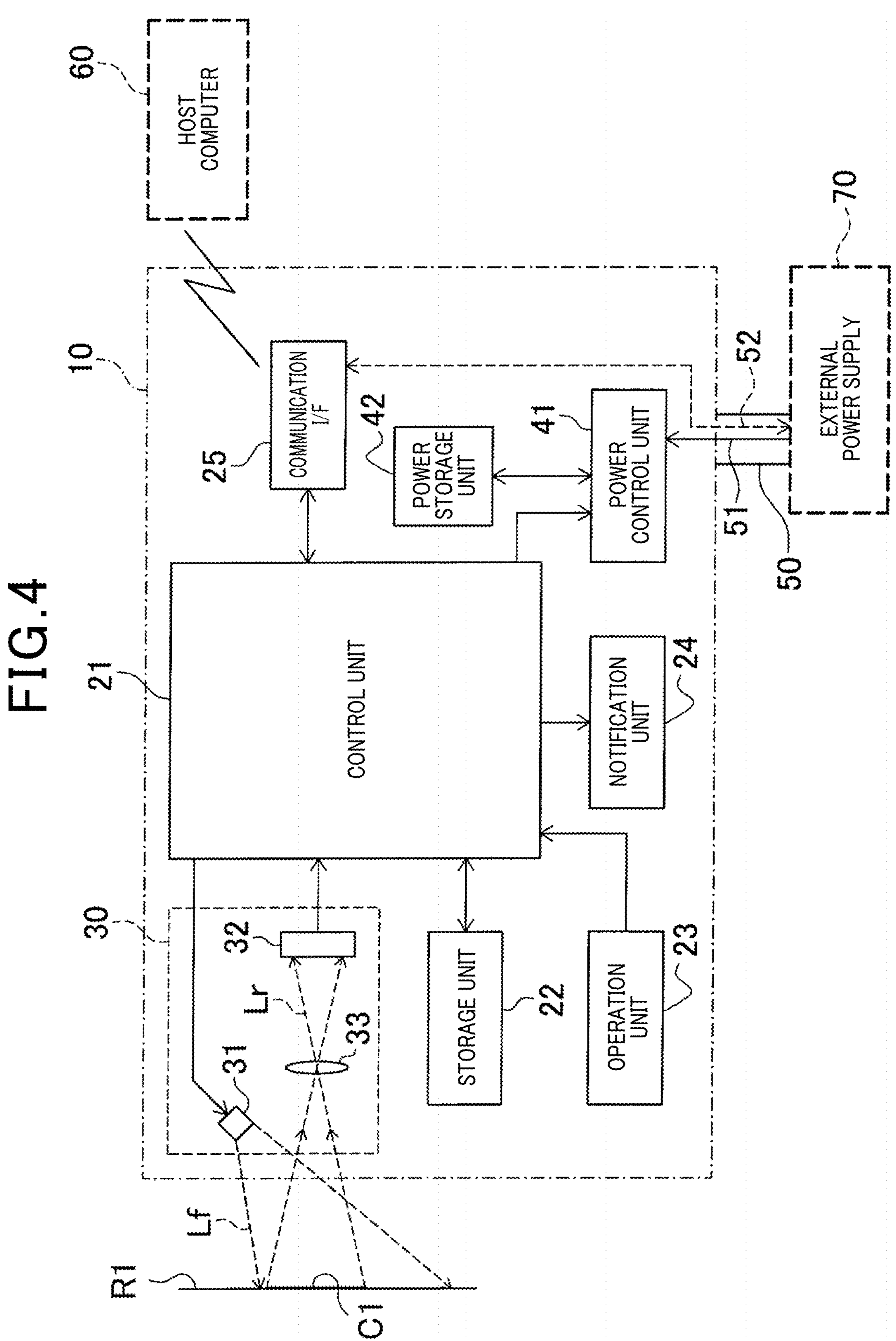
FIG. 4 is a block diagram schematically illustrating the configuration of an information code reading device according to a modification example of the first embodiment.

In a modification example of the present embodiment, as illustrated in FIG. 4, the cable 50 may include a power line 51 for power supply and also a signal line 52 for transmitting a signal for detecting the state of connection to the external power supply 70. In response to the interruption of signals through the signal line 52, it may be determined that the power supply is shut off. In this manner, the use of the power line 51 and also the signal line 52 included in the cable 50 enables easy determination that the power supply via the cable 50 is shut off.

Second Embodiment

An information code reading device according to a second embodiment of the present disclosure will now be described with reference to the drawings.

The second embodiment is different from the first embodiment mainly in that a part of the information stored in the storage unit 22 is deleted upon determination that the power supply is shut off. The same reference signs as in the first embodiment denote substantially the same components, and a description thereof is omitted.

When confidential information is recorded in an information code, the information code is encrypted. For example, the information code may be generated as a partially secret code including an open area and a secret area. In the open area, information that requires no decoding key is recorded. In the secret area, encrypted information that requires a decoding key is recorded. The recording of confidential information in the secret area and less-confidential information in the open area allows the confidential information to be read by only an information code reading device that has the decoding key. This is because an information code reading device that does not have the decoding key can read only the less-confidential information from the open area and cannot recognize that the confidential information is recorded. A method for generating such a partially secret code and a generated partially secret code may be achieved by suitably using the techniques disclosed in documents (for example, JP 2009-9547 A and JP 2008-299422 A).

However, if the information code reading device 10 including the storage unit 22 that has stored the decoding key therein is stolen, the decoding key stored in the information code reading device 10 may be used for a malicious purpose. For example, the decoding key stored in the storage unit 22 may be used by a thief to read encrypted confidential information.

Figure 5:
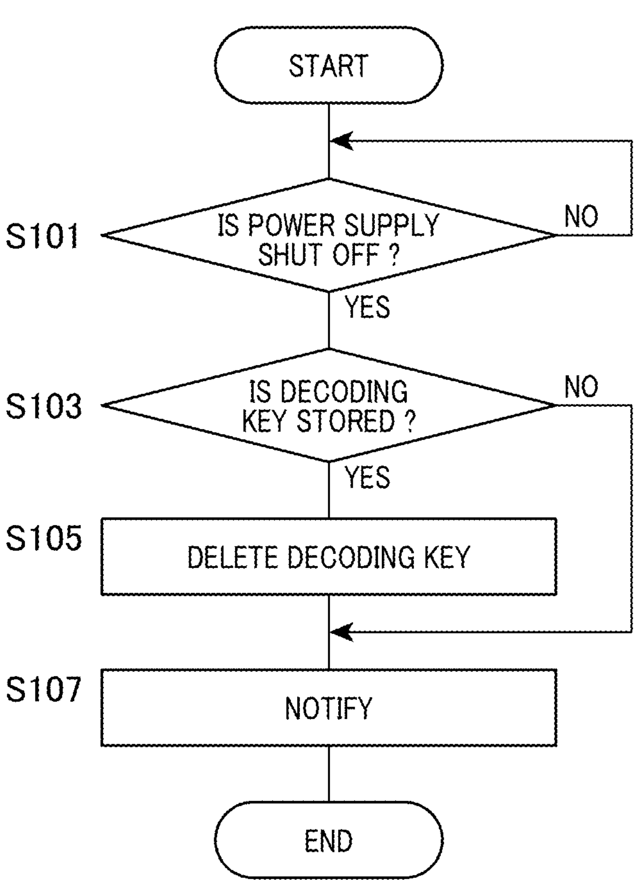
FIG. 5 is a flowchart showing processing of an information code reading device according to a second embodiment.

To prevent this, the information code reading device 10 in the present embodiment deletes the decoding key stored in the storage unit 22 when, in the detection processing performed by the control unit 21, the control unit 21 determines that the power supply is shut off. This is because when the power supply is shut off, the information code reading device 10 may have been stolen. Specifically, as shown in the flowchart of FIG. 5, upon determination that the power supply is shut off (Yes in S101), the control unit 21 determines whether the storage unit 22 has stored a decoding key therein. In a case where the storage unit 22 has stored a decoding key therein (Yes in S103), the control unit 21 deletes the decoding key in the storage unit 22 (S105). The control unit 21 causes the notification unit 24 to perform the predetermined notification until the electric power in the power storage unit 42 is used up (S107). This detection processing ends with the end of the predetermined notification. In this manner, the deletion of the decoding key takes precedence over the notification by the notification unit 24.

Thus, even if the information code reading device 10 is removed in an unauthorized manner, the decoding key stored in the storage unit 22 is deleted in response to the shutoff of the power supply via the cable 50. This can prevent unauthorized use of the decoding key.

Third Embodiment

An information code reading device according to a third embodiment of the present disclosure will now be described with reference to the drawings.

The third embodiment is different from the first embodiment mainly in that predetermined functions are restricted upon determination that the power supply is shut off. The same reference signs as in the first embodiment denote substantially the same components, and a description thereof is omitted.

In the present embodiment, when, in the detection processing performed by the control unit 21, the control unit 21 determines that the power supply is shut off, function restriction processing is performed. The function restriction processing turns the information code reading device 10 into a state in which, among the functions of the information code reading device 10, predetermined functions other than the notification function for the predetermined notification are restricted (hereinafter, also referred to as a function restricted state).

Thus, even if the information code reading device 10 is removed in an unauthorized manner, the predetermined functions are restricted in response to the shutoff of the power supply via the cable 50. This can prevent the unauthorized use of the predetermined functions. In addition, the restriction can also lower the value of the stolen information code reading device 10.

Furthermore, in the present embodiment, when, in the detection processing performed by the control unit 21, the control unit 21 determines that the power supply is shut off, function restriction information is stored into the storage unit 22. The function restriction information indicates that the information code reading device 10 is in a state in which the predetermined functions are to be restricted. When the function restriction information is stored in the storage unit 22 at power-on, the function restriction processing is performed regardless of whether the power supply is shut off.

Thus, even if a thief unauthorizedly boots up the information code reading device 10 that has been shut off when stolen, the function restriction information stored in the storage unit 22 enables the function restricted state to be maintained.

In the present embodiment, the predetermined functions as described above include a wireless communication function. Specifically, the restricted predetermined functions may be wireless communication through the communication interface 25 with another external device different from the host computer 60 to which the reading result has been wirelessly transmitted until immediately before the power supply is shut off.

Accordingly, when the power supply is shut off, the information code reading device 10 cannot wirelessly communicate with the other external device. On the other hand, the information code reading device 10 can continue wireless communication with the host computer 60 with which the wireless communication is established until immediately before the shutoff. In the case of a power supply shutoff caused by an unauthorized action such as a theft, the wrongdoer may attempt wireless communication between the information code reading device 10 and other external devices. However, in this case, the inability of the information code reading device 10 to wirelessly communicate with other external devices can prevent information leakage from the information code reading device 10 through wireless communication. In the case of an unintended power supply shutoff caused by, for example, an accidental disconnection of the cable 50, the user may attempt to resume the wireless communication between the information code reading device 10 and the host computer 60. In this case, the convenience of the user is not reduced since the information code reading device 10 can wirelessly communicate with the host computer 60. In this manner, the wireless communication function can be properly restricted. In the function restricted state, the wired communication function through the communication interface 25 may also be restricted.

The predetermined functions restricted as described above may be, for example, the function of the illuminating light source 31 for applying the illumination light Lf to an information code. In this case, the information code reading device 10 restricts the function for applying the illumination light Lf (i.e., a function easily perceivable by humans). This can mislead the user (for example, the thief) into believing that the information code reading device 10 is out of order and unusable. The restricted predetermined functions may be, for example, at least one of a light emission function of the light emitter and a sound output function of the sound output portion that are activated under different conditions than the predetermined notification. In this case, the information code reading device 10 restricts the light emission function or the sound output function (i.e., functions easily perceivable by humans). This can mislead the user (for example, the thief) into believing that the information code reading device 10 is out of order and unusable.

Fourth Embodiment

An information code reading device according to a fourth embodiment of the present disclosure will now be described with reference to the drawings.

The fourth embodiment is different from the third embodiment mainly in that the restriction of the predetermined functions can be cancelled. The same reference signs as in the third embodiment denote substantially the same components, and a description thereof is omitted.

In the present embodiment, the control unit 21 performs processing for cancelling the restriction of the predetermined functions in response to a restriction cancellation instruction received from outside. For example, an accidental disconnection of the cable 50 may shut off the power supply and shift the information code reading device 10 to the function restricted state. Even in this case, a person authorized to give a restriction cancellation instruction can cancel the function restricted state.

In the present embodiment, the restriction cancellation instruction is issued by reading an information code in which information indicating the restriction cancellation instruction is recorded (hereinafter, also referred to as a restriction cancellation code). For example, the restriction cancellation code may be a QR code printed on an employee certificate. The employee number recorded in the QR code may be the information indicating the restriction cancellation instruction.

Thus, with the function restriction information stored in the storage unit 22 at power-on (i.e., upon the resumption of the power supply via the cable 50), the predetermined functions are restricted. In the function restricted state, a trigger switch operation for starting reading activates processing for reading the information code to which the reading port would be facing (i.e., the restriction cancellation code). When the restriction cancellation code is successfully read, the control unit 21 performs processing for cancelling the function restricted state (for example, processing for deleting the function restriction information in the storage unit 22).

Figure 6:
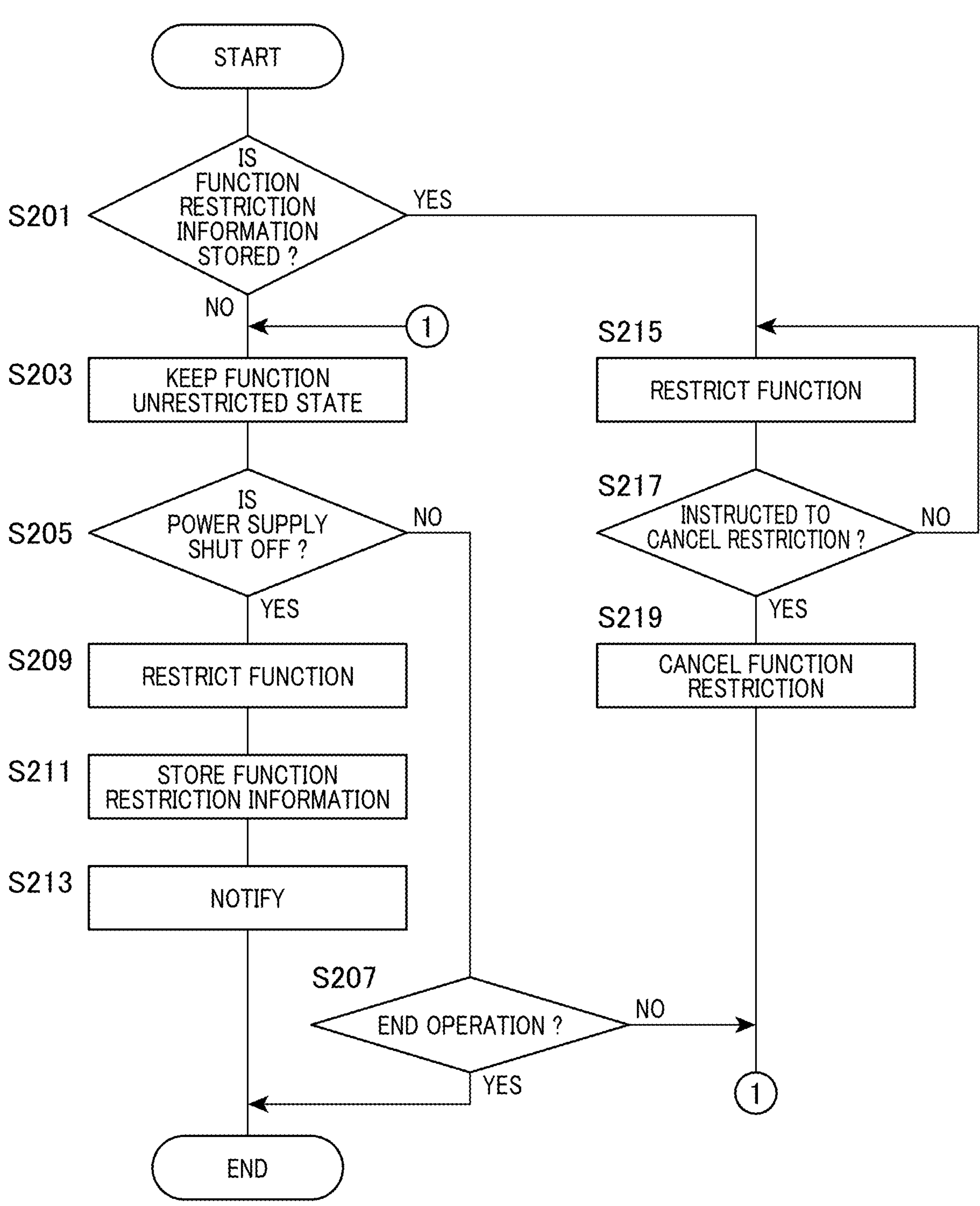
FIG. 6 is a flowchart showing processing of an information code reading device according to a fourth embodiment.

The detection processing including the processing for cancelling the restriction of the predetermined functions in the present embodiment will now be described in detail with reference to the flowchart shown in FIG. 6.

Upon power on, the control unit 21 starts the detection processing. In step S201, the control unit 21 determines whether the storage unit 22 has stored the function restriction information therein. In a case where the storage unit 22 has stored no function restriction information therein (No in S201), the state without the predetermined functions restricted is maintained (S203). In a case where it is determined that the power supply is not shut off (No in S205), the function unrestricted state is maintained until an end operation is detected (No in S207, S203).

In a case where it is determined as described above that the power supply is shut off with no function restricted as described above (Yes in S205), the function restriction processing is performed (S209). This processing turns the information code reading device 10 into the function restricted state in which the predetermined functions are restricted. The function restriction information is stored into the storage unit 22 using the electric power supplied from the power storage unit 42 as a part of the notification processing (S211). The notification unit 24 performs the predetermined notification as described above (S213). The detection processing is then ended.

After that, when the power supply is turned on again, the control unit 21 restarts the detection processing. Since the storage unit 22 has stored the function restriction information therein (Yes in S201), the function restriction processing is performed (S215). This processing turns the information code reading device 10 into the function restricted state in which the predetermined functions are restricted. In a case where the information code reading device 10 is determined to have not received the restriction cancellation instruction (No in S217), the function restricted state is maintained.

In the function restricted state, when the restriction cancellation code is successfully read as described above, the information code reading device 10 is determined to have received the restriction cancellation instruction (Yes in S217). In this case, the restriction of the predetermined functions are cancelled in the processing for cancelling the restriction of the predetermined functions, and the function restriction information in the storage unit 22 is deleted (S219). Then, the state without the function restricted is maintained (S203).

As described above, the information code reading device 10 according to the present embodiment acquires the restriction cancellation instruction by reading the information code (i.e., the restriction cancellation code). This enables the information code reading device 10 to have the function restriction cancelled by usual reading operation without especial operation.

The restriction cancellation instruction may also be acquired by a predetermined operation (for example, holding down for a predetermined time or longer, or at least a predetermined number of consecutive operations) on the trigger switch (i.e., the operation unit 23) operated to start the reading processing. Also in this case, such a relatively easy operation allows the information code reading device 10 to have the function restriction cancelled.

The restriction cancellation instruction may also be a predetermined command received from the host computer 60 capable of wireless communication even in the function restricted state. In this case, the control unit 21 cancels the restriction of the predetermined functions depending on the restriction cancellation instruction received from the host computer 60 through wireless communication. Since outsiders who cannot use the host computer 60 cannot cancel the restriction of the predetermined functions, unauthorized use of the predetermined functions can be reliably prevented.

Fifth Embodiment

An information code reading device according to a fifth embodiment of the present disclosure will now be described with reference to the drawings.

The fifth embodiment is different from the first embodiment mainly in that the predetermined notification can be stopped in response to a notification stop instruction. The same reference signs as in the first embodiment denote substantially the same components, and a description thereof is omitted.

For example, in a case where the power supply is shut off due to an accidental disconnection of the cable 50, the control unit 21 causes the notification unit 24 to perform the predetermined notification unnecessarily. The predetermined notification continues until the power storage unit 42 runs out of the stored electric power.

Figure 7:
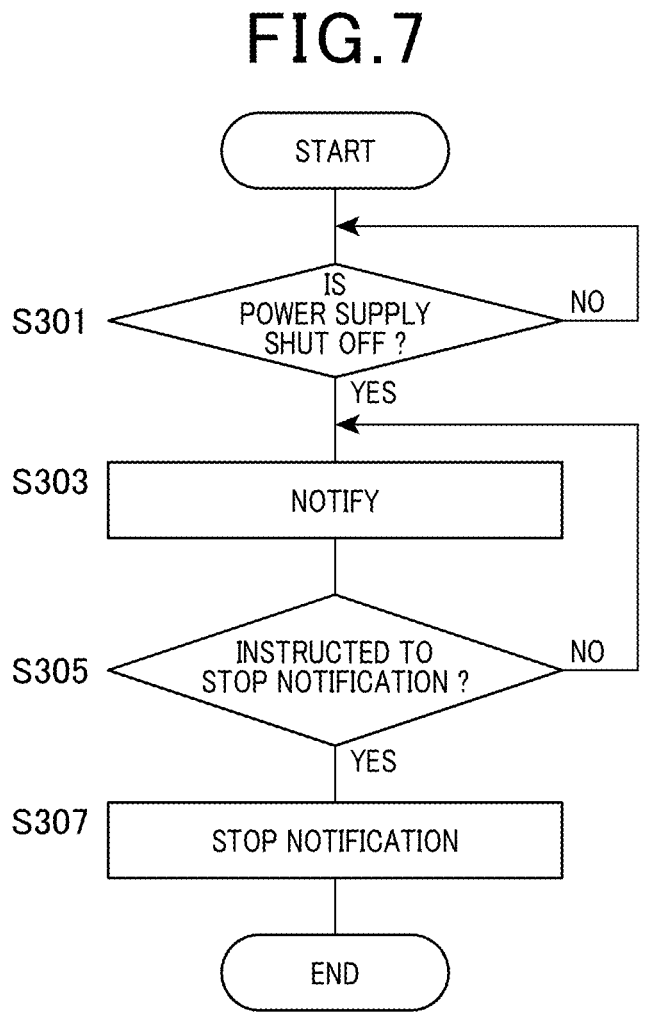

For this reason, in the detection processing performed by the control unit 21 in the present embodiment, processing for stopping the predetermined notification is performed in response to a notification stop instruction received from outside. Specifically, as shown in the flowchart of FIG. 7, in a case where it is determined that the power supply is shut off (Yes in S301), the notification unit 24 starts the predetermined notification (S303). In a case where the information code reading device 10 has received no notification stop instruction (No in S305), the notification unit 24 performs the predetermined notification until the electric power in the power storage unit 42 is used up. In a case where the information code reading device 10 receives a notification stop instruction during the predetermined notification (Yes in S305), the notification unit 24 stops the notification (S307). The detection processing is then ended.

Even when the predetermined notification is started, a person authorized to give the notification stop instruction can stop the predetermined notification. For example, the authorized person can stop an unnecessary notification caused as described above by an accidental disconnection of the cable 50.

In the present embodiment, the notification stop instruction is issued by reading an information code in which information indicating the notification stop instruction is recorded (hereinafter, also referred to as a notification stop code). When the power supply is shut off, the illumination function of the illuminating light source 31 and the function of wirelessly transmitting the reading result are deactivated, and the predetermined notification is started. After that, the cable 50 is connected. Then, a trigger switch operation for starting reading activates processing for reading the information code to which the reading port would be facing (i.e., the notification stop code). When the notification stop code is successfully read, it is determined that the information code reading device 10 has received the notification stop instruction (Yes in S305), the control unit 21 performs processing for stopping the predetermined notification (S307).

In this manner, the notification stop instruction is acquired by reading the notification stop code. This enables the information code reading device 10 to stop the predetermined notification by usual reading operation without a special operation.

The notification stop instruction may also be acquired by a predetermined operation (for example, holding down for a predetermined time or longer or at least a predetermined number of consecutive operations) on the trigger switch (i.e., the operation unit 23) operated to start the reading processing. Also in this case, such a relatively easy operation allows the information code reading device 10 to stop the predetermined notification.

The notification stop instruction may also be a predetermined command received from the host computer 60 capable of wireless communication even in the function restricted state. Also in this case, the information code reading device 10 is allowed to stop the predetermined notification.

In the present embodiment, as described in the fourth embodiment, the restricted predetermined functions may be cancelled. In this case, the notification stop instruction may include the restriction cancellation instruction. Alternatively, the restriction cancellation instruction may include the notification stop instruction. This enables a single instruction to serve as instructions to stop the predetermined notification and cancel the function restriction.

Sixth Embodiment

An information code reading device according to a sixth embodiment of the present disclosure will now be described with reference to the drawings.

The sixth embodiment is different from the fifth embodiment mainly in that the notification timing of the predetermined notification can be set. The same reference signs as in the fifth embodiment denote substantially the same components, and a description thereof is omitted.

In the detection processing performed by the control unit 21 in the present embodiment, the notification timing of the predetermined notification is any one of a first timing immediately after determination that the power supply is shut off and a second timing when a predetermined time (for example, 10 seconds) has elapsed from the first timing. In a case in which the notification timing is preset to the first timing, in response to determination that the power supply is shut off, the notification unit 24 uses the electric power supplied from the power storage unit 42 to perform the predetermined notification immediately after the determination. In the other case in which the notification timing is preset to the second timing, in response to determination that the power supply is shut off, the notification unit 24 uses the electric power supplied from the power storage unit 42 to perform the predetermined notification after the predetermined time has elapsed from the determination.

As described above, in the present embodiment, the notification timing of the predetermined notification can be set to any one of the timing immediately after determination that the power supply is shut off (i.e., the first timing) and the timing when the predetermined time has elapsed from the determination (i.e., the second timing). For example, setting the notification timing to the second timing can provide a delay time for giving a notification stop instruction.

The notification timing of the predetermined notification is not limited to being preset. The notification timing may be selected. Specifically, for example, in a case where no instruction has been given to delay the notification timing, the notification timing may be set to the first timing. In a case where an instruction has been given to delay the notification timing, the notification timing may be set to the second timing. In the case in which no instruction has been given to delay the notification timing, in response to determination that the power supply is shut off, the notification unit 24 uses the electric power supplied from the power storage unit 42 to perform the predetermined notification immediately after the determination. In the case in which an instruction has been given to delay the notification timing, in response to determination that the power supply is shut off, the notification unit 24 uses the electric power supplied from the power storage unit 42 to perform the predetermined notification after the predetermined time has elapsed from the determination. Thereby, the notification timing of the predetermined notification may be switched between the first timing and the second timing depending on whether an instruction has been given to delay the notification timing.

The notification timing delaying instruction may be acquired by, for example, reading an information code in which information indicating the notification timing delaying instruction is recorded. The notification timing delaying instruction may also be acquired by a predetermined operation on the operation unit 23, such as the trigger switch. The notification timing delaying instruction may be a predetermined command received through the host computer 60. The notification timing delaying instruction may include information about the time difference between the first timing and the second timing (i.e., the predetermined time). For the second timing, the predetermined time may be changed based on the information about the predetermined time. For example, the predetermined time may be changed from 10 seconds to 20 seconds.

The above-mentioned function restriction processing may be performed at the notification timing set as described above. That is, in a case where the notification timing is set to the first timing, the function restriction processing and also the predetermined notification are performed immediately after determination that the power supply is shut off. In a case where the notification timing is set to the second timing, the function restriction processing and also the predetermined notification are performed after the predetermined time has elapsed from the determination that the power supply is shut off. Thereby, the function restriction timing as well as the notification timing can be switched.

In a modification example of the present embodiment, the predetermined notification may be an alarm sound that becomes louder in a stepwise manner. Specifically, the control unit 21 activates the sound output portion of the notification unit 24 in a manner that increases, for example, the volume and pitch of the alarm sound gradually from the minimum level. This enables the notification level to be switched in a stepwise manner. For example, the volume of the alarm sound may change in a stepwise manner from low, to medium, to high. The pitch (i.e., the frequency) of the alarm sound may change in a stepwise manner from low, to medium, to high. This can provide a delay time for giving a notification stop instruction while notifying the surroundings of the unauthorized removal.

Seventh Embodiment

An information code reading device according to a seventh embodiment of the present disclosure will now be described with reference to the drawings.

The seventh embodiment is different from the first embodiment mainly in that whether the predetermined notification is performed depends on the receipt of an instruction to stop the power supply from the external power supply. The same reference signs as in the first embodiment denote substantially the same components, and a description thereof is omitted.

The external power supply 70 is a terminal having a power supply function (hereinafter, also simply referred to as a power supply terminal). For example, the power supply terminal may be a personal computer. In this case, when the power supply terminal is in the power-off state, the power supply via the cable 50 may be stopped. The power supply terminal enters the power-off state when shut down or turned into a sleep mode. When the power supply stops in this manner, the power supply is shut off. Upon determination that the power supply is shut off, the predetermined notification and the function restriction are performed as described above even when the power supply terminal and the information code reading device 10 are connected through the cable 50.

Thus, in the present embodiment, when stopping the power supply, the power supply terminal transmits an instruction for power supply stop processing to the information code reading device 10. In the detection processing performed by the control unit 21, when it is determined that the power supply is shut off with no instruction for power supply stop processing received, the predetermined notification is performed. With an instruction for power supply stop processing received, the predetermined notification is not performed. The control unit 21 performs processing for receiving an instruction for power supply stop processing from the power supply terminal.

Figure 8:
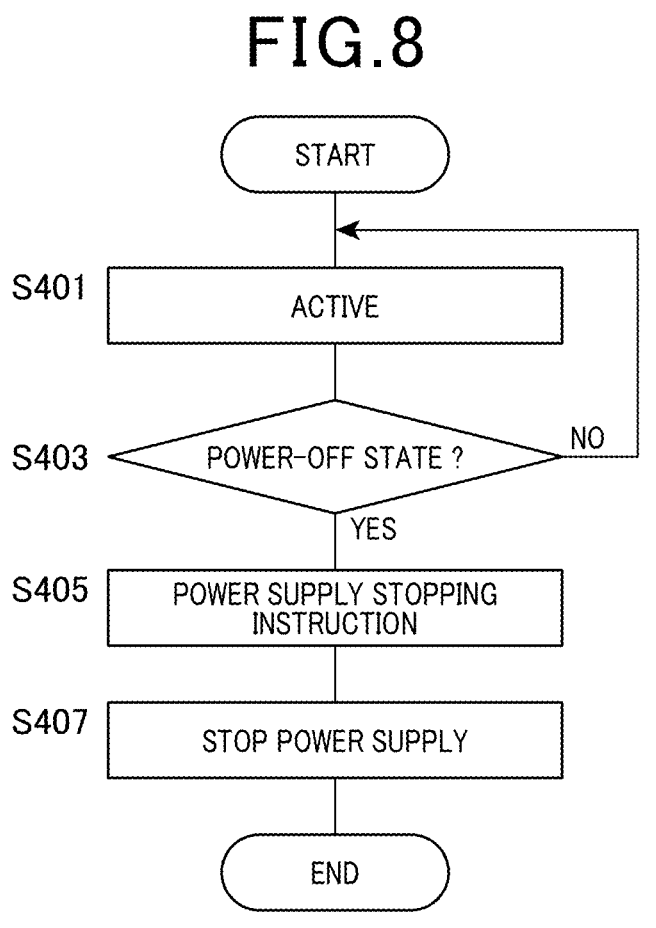

The power supply terminal in the present embodiment has a USB port capable of supplying power in a USB connected state through the cable 50. As shown in the flowchart of FIG. 8, the power supply terminal can supply electric power through the cable 50 in the power-on state (S401). In a case where the power supply terminal is not in the power-off state (No in S403), the power supply terminal keeps the state capable of supplying electric power. When the power supply terminal enters the power-off state in response to a predetermined power-off operation (for example, shutdown or sleep operation) (Yes in S403), an instruction for USB compliant power supply stop processing is output through the cable 50 (S405). Then, the power supply via the cable 50 is stopped (S407).

Figure 9:
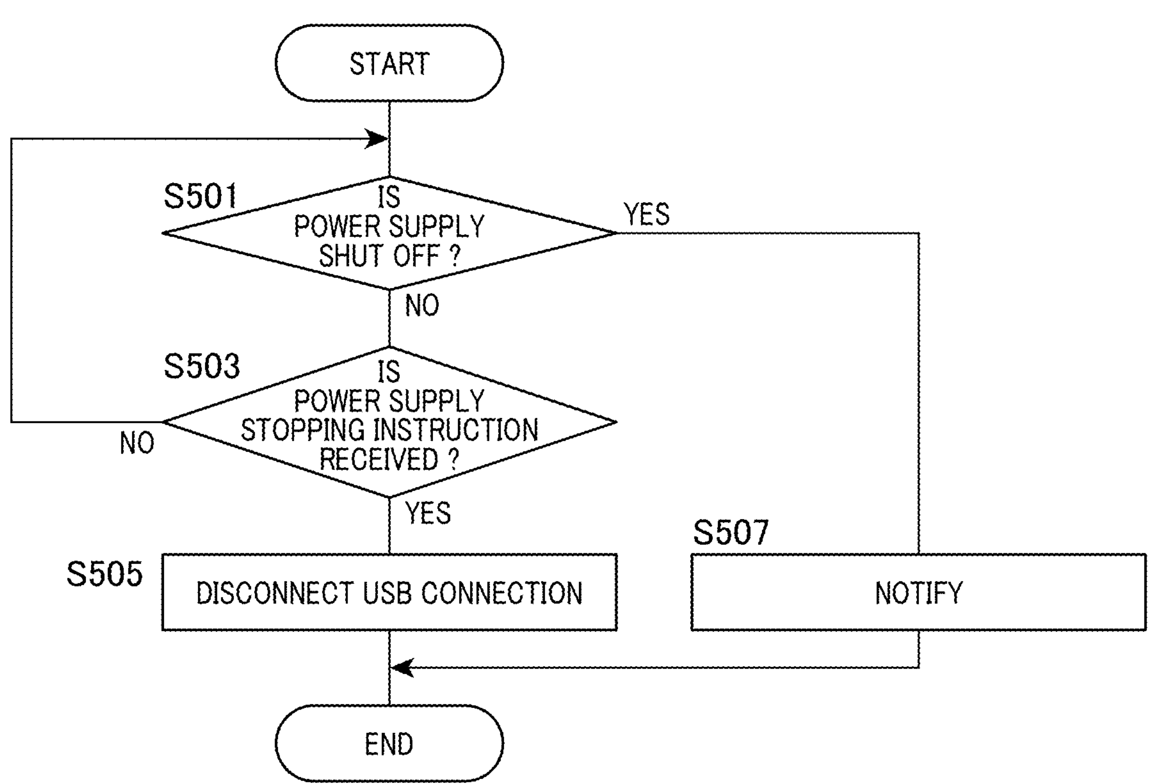
FIG. 9 is a flowchart showing processing of an information code reading device according to the seventh embodiment.

On the other hand, in the detection processing performed by the control unit 21 of the information code reading device 10 supplied with electric power from the power supply terminal, processing is performed as shown in the flowchart of FIG. 9. Before determination that the power supply is shut off (No in S501), the information code reading device 10 receives an instruction for power supply stop processing from the power supply terminal through the communication interface 25 (Yes in S503). In this case, processing is performed to disconnect the USB connection via the cable 50 (S505). Then, the detection processing is ended without the predetermined notification.

Before the receipt of an instruction for power supply stop processing (No in S503), in a case where it is determined that the power supply is shut off (Yes in S501), the notification unit 24 performs the predetermined notification using the electric power supplied from the power storage unit 42 (S507). The detection processing is then ended. That is, when the power supply is shut off, the predetermined notification is performed without the receipt of an instruction for power supply stop processing.

In this manner, for an intended shutoff of the electric power supply, such as turning off the power supply terminal, the information code reading device 10 receives an instruction for power supply stop processing from the power supply terminal. This can prevent unnecessary notification by the information code reading device 10.

The predetermined notification may be further transmitted to the predetermined external device such as the host computer 60 through the wireless communication by the communication interface 25. In this case, the host computer 60 that has received the predetermined notification may display a screen concerning the predetermined notification using, for example, a display. This enables the manager of the host computer 60 to know of an unauthorized removal (for example, see FIG. 3A).

The power supply terminal is not limited to being connected to the information code reading device 10 through the USB-connectable power-supplying cable 50. The power supply terminal may be connected through a power-supplying cable 50 compliant with another power-supplying connection standard (for example, RS-232C). The power supply terminal may transmit, for example, a specific command indicating the instruction for power supply stop processing to the information code reading device 10 through wireless communication or the cable 50. This can instruct the information code reading device 10 for power supply stop processing.

The present disclosure is not limited to the embodiments and modification examples described above. The embodiments and modification examples of the present disclosure may be altered, for example, as described below.

(1) The external power supply 70 is not limited to a power supply terminal that is a personal computer capable of power supply via USB. The external power supply 70 may be, for example, a commercial power supply.

(2) In the reading processing performed by the control unit 21, the reading result may be transmitted to a predetermined external device (for example, a tablet) different from the host computer 60 through the wireless communication by the communication interface 25. The predetermined notification may be transmitted to the predetermined external device through the wireless communication by the communication interface 25. This enables the manager of the predetermined external device to know of an unauthorized removal.

(3) The electric power supplied from the power storage unit 42 may be used for reading processing and transmission of reading result. Alternatively, the information code reading device 10 may include a power storage unit for reading processing and transmission of reading result.

What is claimed is:

1. An information code reading device comprising:
a processor and a memory,
wherein the processor executes a program stored in the memory to:
perform reading processing by using electric power supplied from an external power supply through a cable;
wirelessly transmit a reading result to a predetermined external device;
determine whether power supply through the cable is shut off;
perform a predetermined notification using electric power supplied from a power storage circuit element in response to determination that the power supply is shut off, wherein the reading processing is processing for optically reading an information code, and the information code reading device comprises the power storage circuit element;

restrict a predetermined function of the information code reading device other than the predetermined notification and store function restriction information into the memory in response to determination that the power supply is shut off; and restrict the predetermined function in a case where the function restriction information is stored in the memory at power-on of the information code reading device.

2. The information code reading device according to claim 1, wherein the cable includes a power line for power supply and a signal line for transmitting a signal for detecting a state of connection with the external power supply, and the processor executes a program stored in the memory to determine that the power supply is shut off in response to an interruption of the signal through the signal line.

3. The information code reading device according to claim 1, wherein the memory stores a decoding key for reading the encrypted information code, and the decoding key stored in the memory is deleted in response to determination that the power supply is shut off.

4. The information code reading device according to claim 1, wherein the predetermined function is a function of wireless communication with another external device different from the predetermined external device to which the reading result is wirelessly transmitted before the power supply is shut off.

5. The information code reading device according to claim 4, wherein the processor executes a program stored in the memory to cancel the restriction of the predetermined function in response to a restriction cancellation instruction received wirelessly from the predetermined external device.

6. The information code reading device according to claim 1, wherein the predetermined function is at least one of a function of applying illumination light to an information code, a function of causing a light emitter to emit light, and a sound output function other than sound output function that the predetermined notification includes.

7. The information code reading device according to claim 1, wherein the processor executes a program stored in the memory to cancel the restriction of the predetermined function in response to a restriction cancellation instruction.

8. The information code reading device according to claim 7, wherein the restriction cancellation instruction is acquired by reading an information code in which information indicating the restriction cancellation instruction is recorded.

9. The information code reading device according to claim 7, wherein the information code reading device includes an operation interface operated to start the reading processing, and the restriction cancellation instruction is acquired by a predetermined operation on the operation interface.

10. The information code reading device according to claim 1, wherein the processor executes a program stored in the memory to stop the predetermined notification in response to a notification stop instruction.

11. The information code reading device according to claim 10, wherein the notification stop instruction is acquired by reading an information code in which information indicating the notification stop instruction is recorded.

12. The information code reading device according to claim 1, wherein the processor executes a program stored in the memory to perform the predetermined notification by using electric power supplied from the power storage circuit element at any one of a first timing when the power supply is determined to have been shut off and a second timing when a predetermined time has elapsed from the first timing.

13. The information code reading device according to claim 12, wherein the processor executes a program stored in the memory to:

in a case where no instruction has been given to delay the notification timing, perform the predetermined notification at the first timing by using electric power supplied from the power storage circuit element; and in a case where an instruction has been given to delay the notification timing, perform the predetermined notification at the second timing by using electric power supplied from the power storage circuit element.

14. The information code reading device according to claim 1, wherein the predetermined notification is an alarm sound that becomes louder in a stepwise manner.

15. The information code reading device according to claim 1, wherein the predetermined notification includes wireless transmission to the predetermined external device.

16. The information code reading device according to claim 1, wherein the processor executes a program stored in the memory to:

receive an instruction for power supply stop processing from the external power supply in response to stop of the power supply; and perform the predetermined notification in response to the power supply shut-off without the instruction for power supply stop processing received.

* * * * *